Figure 1:
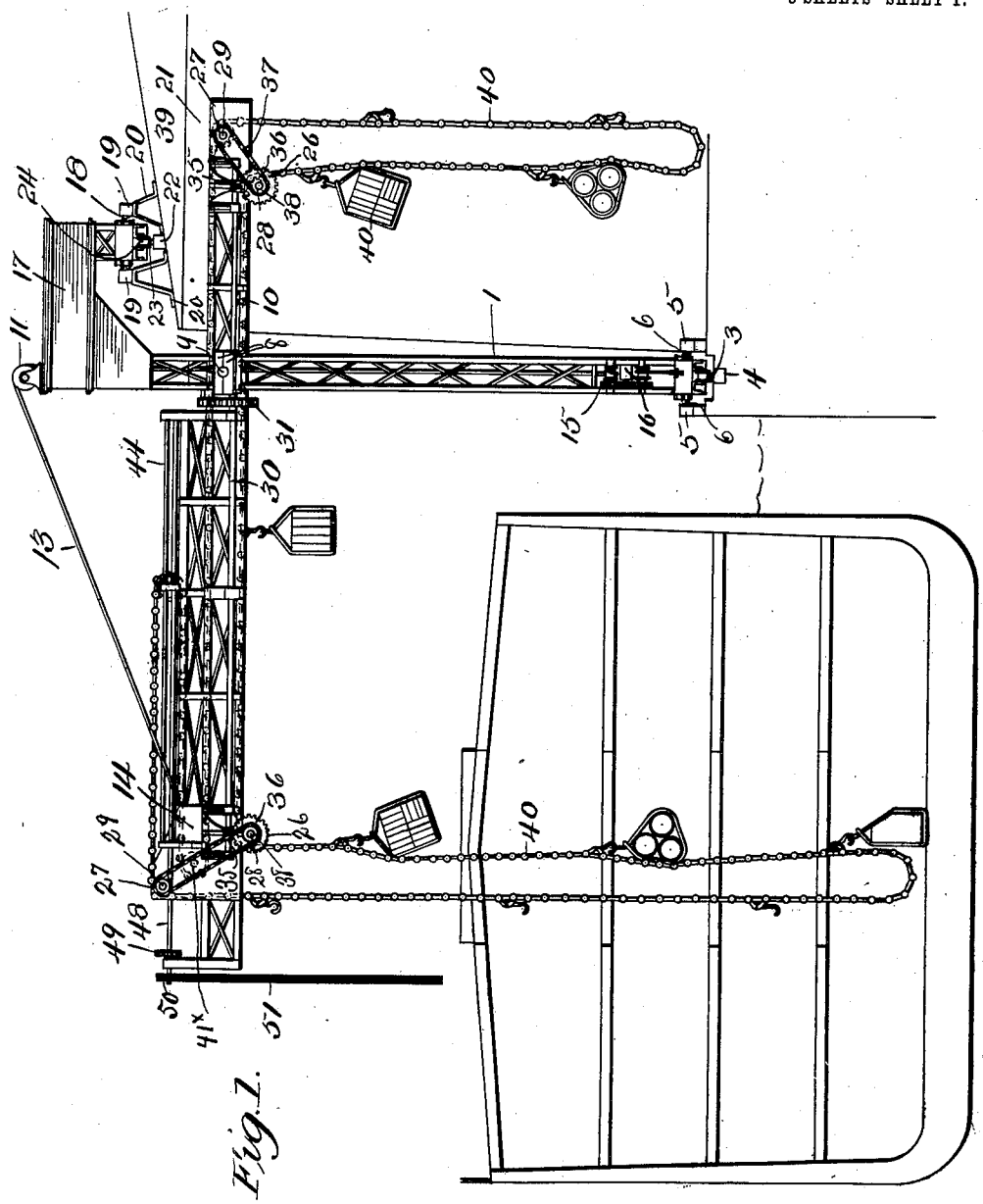

No. 861,264. PATENTED JULY 30, 1907.
F. B. CLARK.
LOADING AND UNLOADING APPARATUS.
APPLICATION FILED AUG. 15, 1906.

5 SHEETS—SHEET 1.

WITNESSES:

INVENTOR
Franklin B. Clark
BY
A. L. Hough.
Attorney

No. 861,264. PATENTED JULY 30, 1907.
F. B. CLARK.
LOADING AND UNLOADING APPARATUS.
APPLICATION FILED AUG. 15, 1906.
5 SHEETS—SHEET 2.
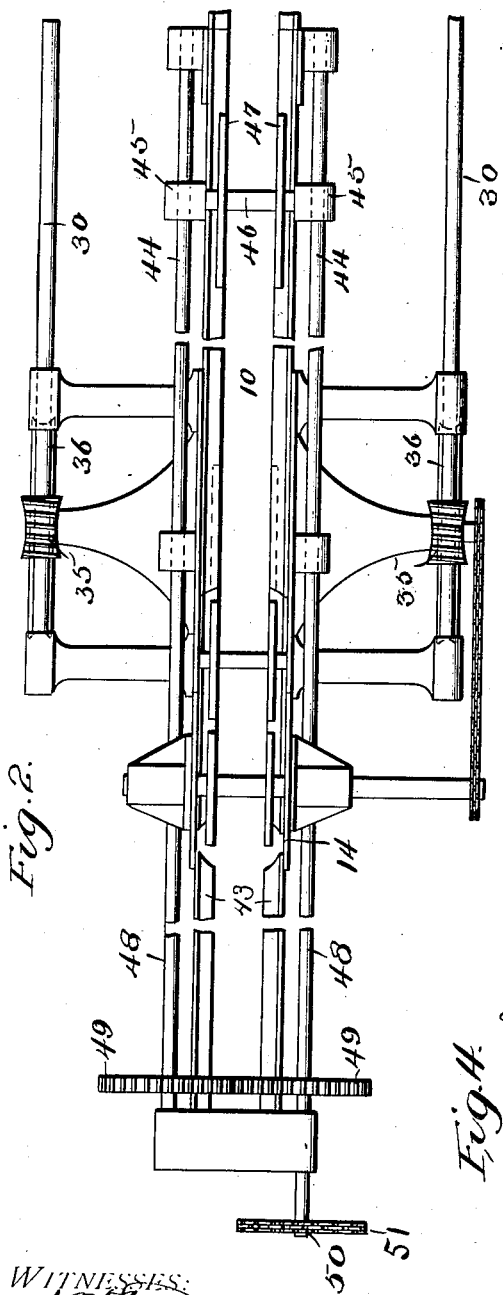
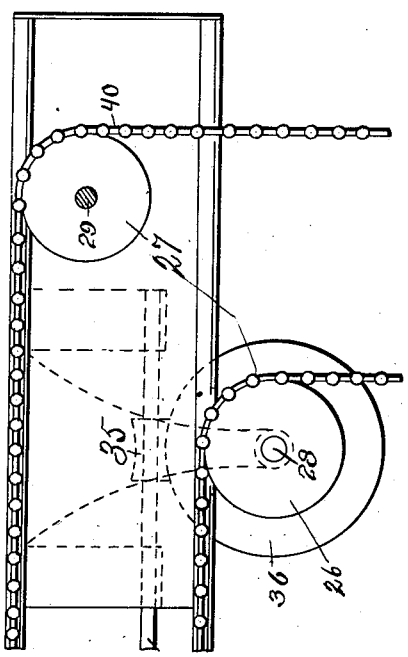
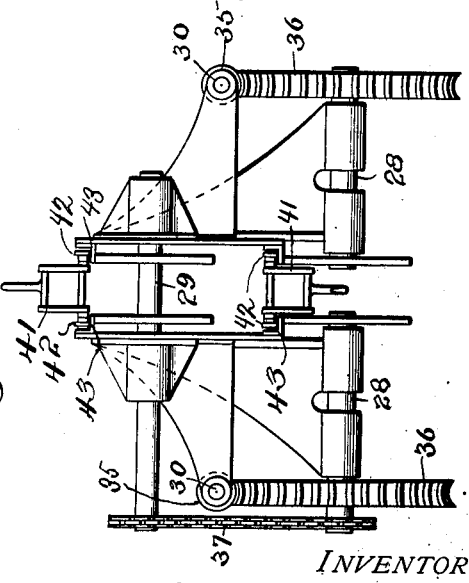
WITNESSES:
INVENTOR
Franklin B. Clark
BY
Attorney

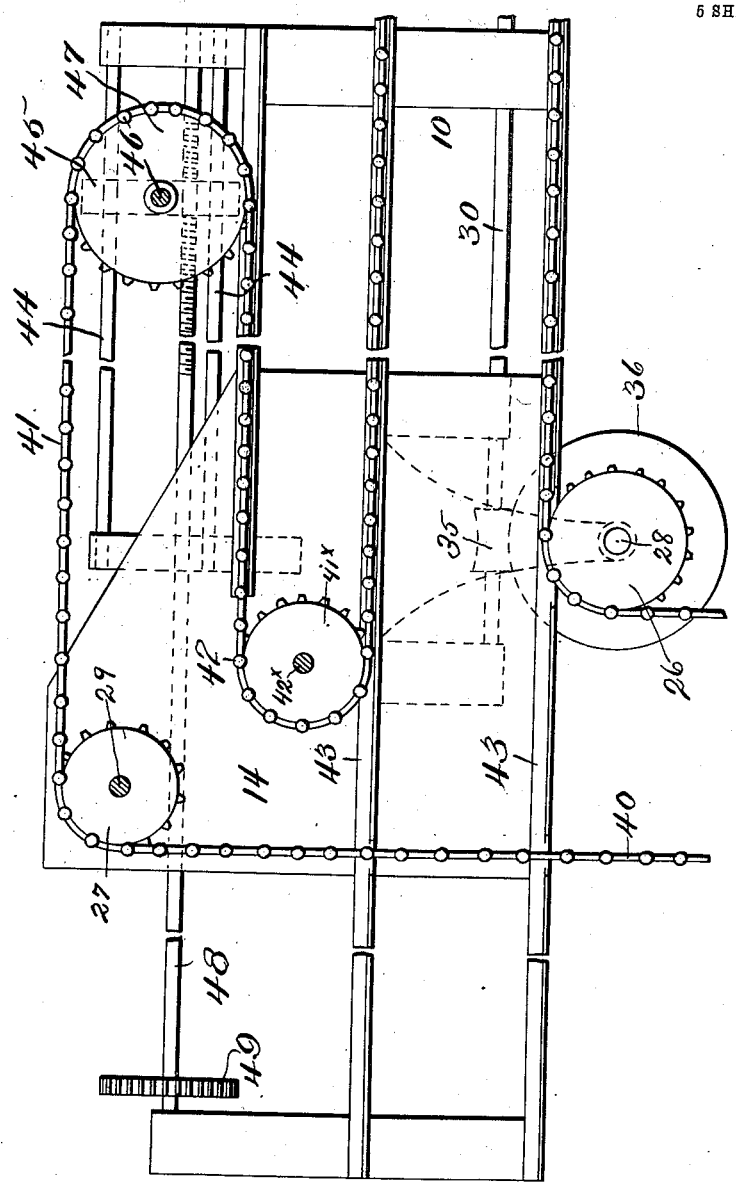

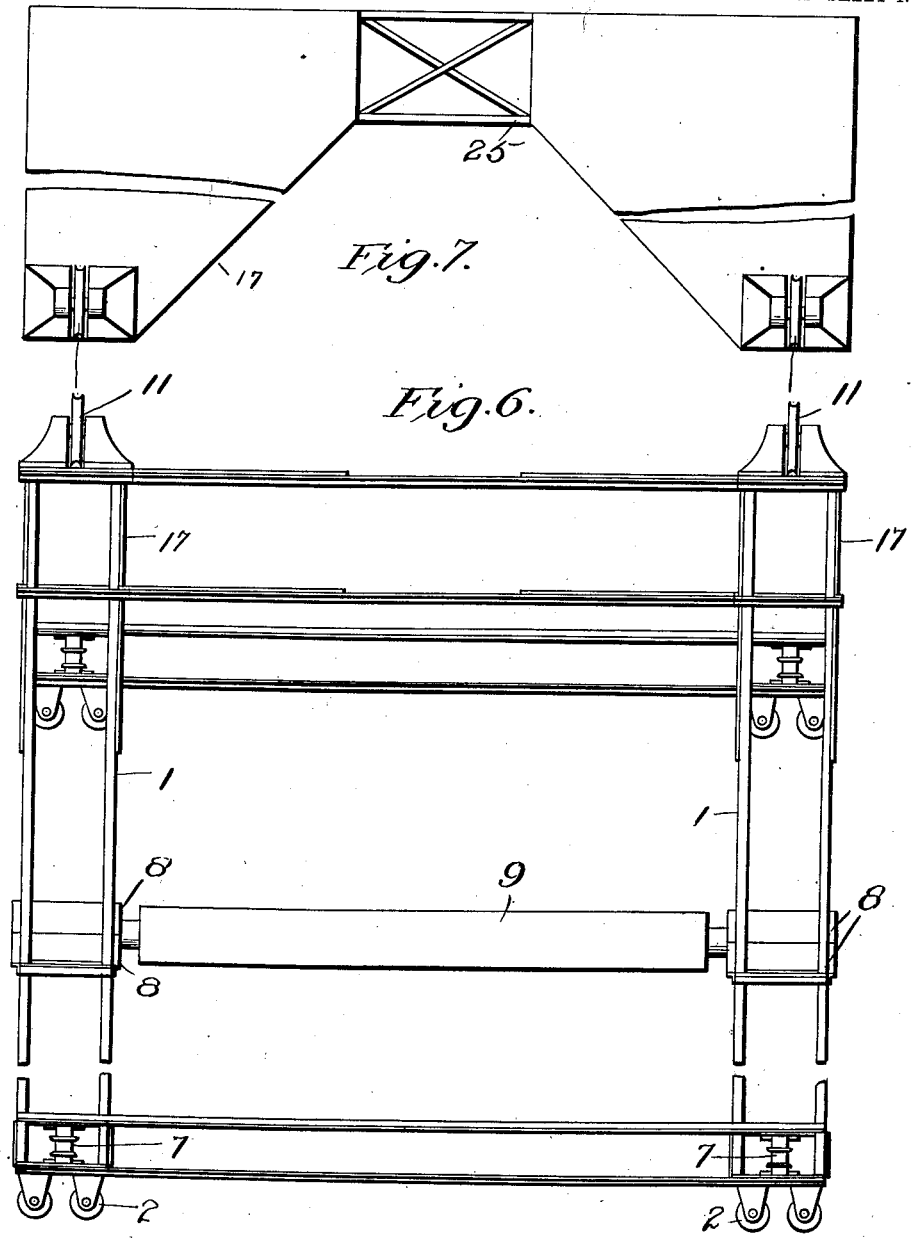

No. 861,264.
PATENTED JULY 30, 1907.
F. B. CLARK.
LOADING AND UNLOADING APPARATUS.
APPLICATION FILED AUG. 15, 1906.
5 SHEETS—SHEET 5.
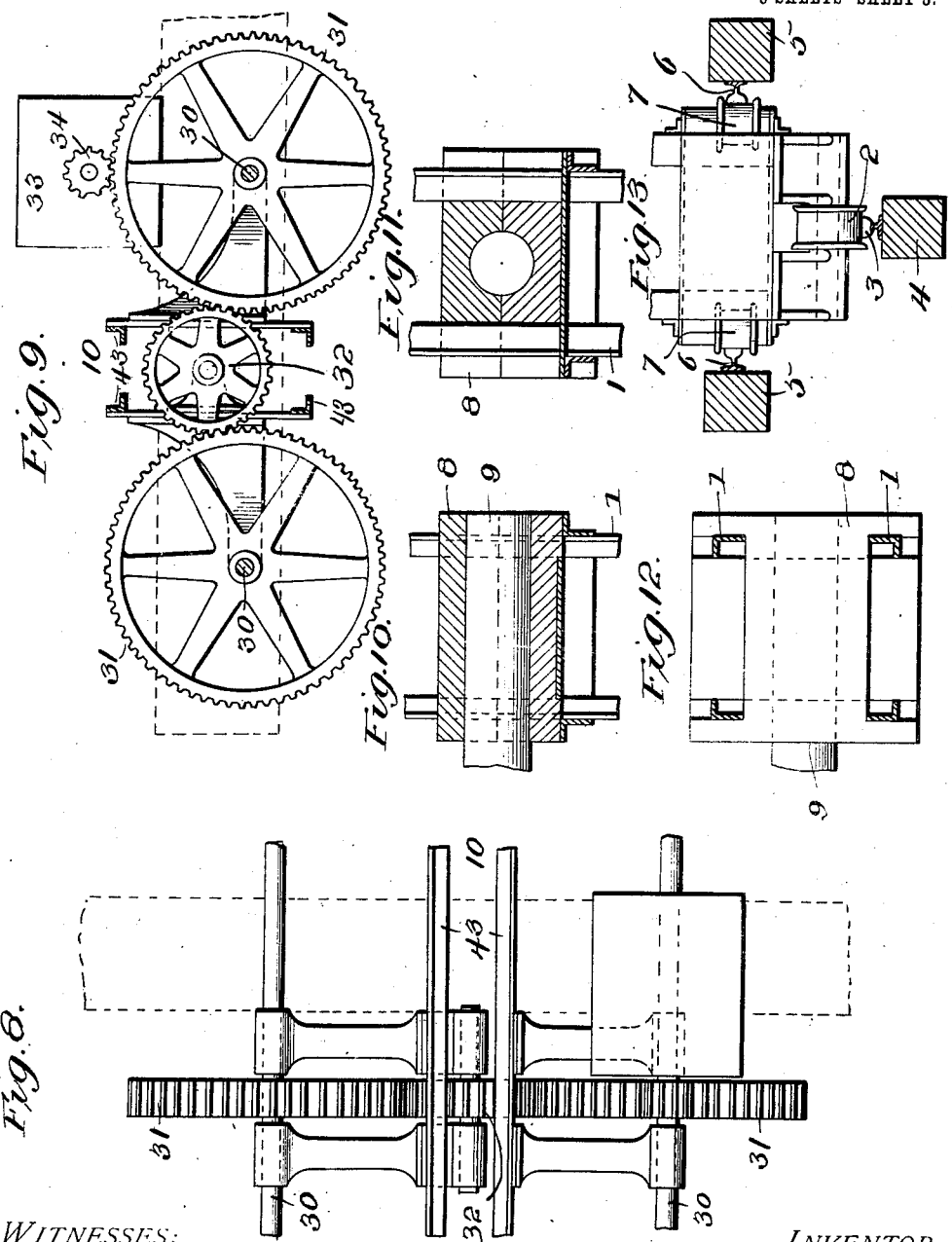
WITNESSES:
INVENTOR
Franklin B. Clark
BY
A. L. Hough
Attorney

UNITED STATES PATENT OFFICE.

FRANKLIN B. CLARK, OF WASHINGTON, DISTRICT OF COLUMBIA, ASSIGNOR TO THE AMERICAN LOADING AND UNLOADING MACHINE COMPANY, (INC.)

LOADING AND UNLOADING APPARATUS.

No. 861,264.        Specification of Letters Patent.        Patented July 30, 1907.

Application filed August 15, 1906. Serial No. 330,748.

*To all whom it may concern:*

Be it known that I, FRANKLIN B. CLARK, a citizen of the United States, residing at Washington, in the District of Columbia, have invented certain new and useful Improvements in Loading and Unloading Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in loading and unloading apparatus and the object in view is to generally improve upon and render more efficient the construction of apparatus of a like nature for which I have been granted Letters Patent in the United States, Number 805,711 and the object of the present invention is to produce a means whereby the slack in the endless carrier may be conveniently regulated and also the provision of means for adapting the loading and unloading device for use in connection with a ware house and so arranged that it may be shifted from door to door for convenience in loading or unloading from a boat to different parts of the house.

My invention comprises various details of construction and combinations and arrangements of parts which will be hereinafter fully described and then specifically defined in the appended claims.

I illustrate my invention in the accompanying drawings, in which:—

Figure 1 is a vertical sectional view showing the application of my invention, parts being illustrated in elevation. Fig. 2 is a top plan view of a portion of the apparatus. Fig. 3 is a vertical sectional view through one end of the apparatus, parts being shown in elevation. Fig. 4 is an end view of the carrier. Fig. 5 is an enlarged view in elevation of the take-up mechanism. Fig. 6 is a side elevation of the support upon which the pivotal truss supporting the carrier is mounted. Fig. 7 is a top plan view of the construction shown in Fig. 6. Fig. 8 is a top plan view of a part of the apparatus showing the motor and the wheels connected therewith. Fig. 9 is a side elevation of the construction shown in Fig. 8. Fig. 10 is a detailed view of the bearing and the shaft upon which the tilting truss is mounted. Fig. 11 is a detailed view in section of the construction shown in Fig. 10. Fig. 12 is a sectional view through the bearing blocks in which the pivot of the truss frame is mounted, and Fig. 13 is an enlarged detailed view showing the side truss rollers and the track upon which the apparatus is mounted.

Reference now being had to the details of the drawings by numerals, 1 designates a standard made preferably of structural iron and having flanged rollers or wheels 2 journaled in the base thereof and adapted to travel upon a track 3 supported by the beam 4, which in the present instance is shown as mounted upon a dock, as the particular apparatus illustrated is designed especially for use in connection with a ware house, whereby boats may be unloaded at various doors in the house. Mounted upon the dock are the beams 5 which have tracks 6 projecting from the adjacent faces thereof and which are adapted to bear against the vertically journaled rollers 7 mounted upon the side of the base of said standard as clearly shown in Fig. 13 of the drawings. Said standard, shown in elevation in Fig. 6 of the drawings, carries the boxings 8, in which a shaft 9 is journaled and upon which shaft, the truss frame 10 is adapted to be pivotally mounted. Mounted at the extreme upper end of said standard are the sheaves 11 over which the hoisting cables 13 are adapted to pass, said cables being fastened to the plates 14 which are fastened to the opposite faces of the truss frame. The lower ends of said cable pass about the drums 15 which are journaled in suitable bearings upon said standards and a motor 16 is provided for actuating said drums, whereby the cable may be wound or unwound accordingly as it may be desired to tilt the projecting portion of the truss frame, which carries the hoisting apparatus up or down. The upper portion of said standard is provided with a housing 17, which may be of any desired shape, adapting the apparatus for various purposes, but in the present instance it is shown as projecting laterally from the standard and is provided with the anti-friction rollers 18 engaging the track rails and projecting from the sides of the beams 19, which are shown as supported by the brackets 20 upon the roof of the ware house 21 and intermediate of said brackets is a beam 22, which supports a track 23 upon which the rollers or wheels 24 are adapted to rest. The detailed construction of the tracks upon the roof and also of the rollers, which are adapted to contact with said tracks, are similar to the construction above described and as illustrated in detail in Fig. 13 of the drawings. A portion of said housing, which is shown in top plan view in Fig. 7 of the drawings, is cut away as at 25 in order to allow the truss frame to tilt freely without interference therefrom. Mounted adjacent to the ends of said truss frame are sprocket wheels 26 and 27 mounted upon the shafts 28 and 29 respectively and 30 designates two rotatable shafts mounted in suitable bearings upon said truss frame and having each a gear wheel 31 fixed thereto, which are in mesh with an intermediate gear wheel 32 shown clearly in Fig. 9 of the drawings, whereby a rotary motion may be imparted from one gear wheel to the other and cause the same to rotate in the same direction. A motor 33 is mounted upon said truss frame and has a gear wheel 34 keyed to its shaft and is in mesh with one of said gear wheels, as shown clearly in Fig. 9 of the drawings, whereby the two shafts 30 may be rotated. Worm wheels 35 are fixed to said shafts 30 and are adapted to gear with the worm wheels 36 upon the shafts 28, whereby rotary movement may be imparted to the latter and in turn to the sprocket wheels 26 upon said shafts 28. Sprocket chains 37 are mounted to travel about the sprocket wheels 38 upon the shafts 28 and the sprocket wheel 27 upon the shafts 29, whereby power may be transmitted from the shafts 28 to the sprocket wheels 27 upon the shafts 29.

40 designates an endless carrier chain made up of links 41, each of which is preferably of the shape shown in Fig. 4 of the drawings, and provided with anti-friction rollers 42 upon the arms thereof, which travel upon the tracks 43 which are supported by the truss frame. 44 designates guide rods which are supported in suitable braces forming a part of said truss frame and 45 designates movable blocks mounted upon said guide rods and carrying stub shafts 46 upon which sprocket wheels 47, shown clearly in Fig. 5 of the drawings, are journaled. 48 designate two threaded shafts which are journaled in suitable bearings and the threaded portions of said shafts are journaled in suitable apertures in the blocks 45. Fixed to said shafts 48 are the intermeshing pinion wheels 49 and 50 designates a sprocket wheel which is fixed to a projecting end of one of said shafts 48 and about which an endless operating chain 51 is adapted to travel, whereby the operator may cause the shaft 48 to rotate in one direction or the other, whereby the blocks 45 upon which the sprocket wheels 47 are mounted may be moved in one direction or the other to regulate the length of the carrier accordingly as may be desired to take up slack or let out the carrier to adapt the same for operation at different elevations.

Referring to Figs. 1 and 5 of the drawings, will be seen a sprocket wheel 41$^x$, there being two of said wheels fixed to rotate with the shaft 42$^x$ and about which wheels the sprocket chain 40 is adapted to travel in passing about the adjustable take-up sprocket wheels 47.

From the foregoing, it will be noted that, by the provision of the apparatus shown and described, the truss frame may be tilted when desired by the manipulation of the motor, which is connected by cable to the forwardly projecting part of the frame, and by the manipulation of the take-up mechanism the endless chain may be adapted for raising and lowering articles at different elevations, it simply being necessary for the operator to adjust the blocks 45 by the manipulation of the endless chain which regulates the control of the same. When it is desired to shift the apparatus from one door to another, it may be easily done by the provision of the apparatus, consisting of the tracks upon which the standard is mounted.

While I have shown my apparatus and described the same as being especially adapted for use as a dock machine, it will be understood that the mechanism may be applied to various uses without, in any way, departing from the spirit of the invention, it merely being necessary to change details of construction to adapt it for various purposes for raising, conveying and lowering articles.

What I claim is:—

1. A loading and unloading apparatus comprising a standard, a truss frame mounted thereon, sprocket wheels mounted upon the latter, an endless conveyer chain mounted upon said sprocket wheels, guide rods upon said frame, bearing blocks movably mounted upon said guide rods, and means for moving said boxes upon the guide rods, as set forth.

2. A loading and unloading apparatus comprising a standard, a truss frame mounted thereon, sprocket wheels mounted upon said frame, an endless conveyer chain mounted upon said sprocket wheels, guide rods upon said frame, bearing blocks movably mounted upon said guide rods, stationary threaded shafts mounted in suitable bearings and passing through threaded apertures in said bearing blocks, gear connections between said threaded shafts and means for rotating one of the latter, as set forth.

3. A loading and unloading apparatus comprising a standard, a truss frame mounted thereon, sprocket wheels mounted upon said frame, an endless conveyer chain mounted upon said sprocket wheels, guide rods upon said frame, bearing blocks movably mounted upon said guide rods, stationary threaded shafts mounted in suitable bearings and passing through threaded apertures in said bearing blocks, gear connections between said threaded shafts, a sprocket wheel fixed to one of said threaded shafts and an endless chain passing over said frame upon the threaded shaft, as set forth.

4. A loading and unloading apparatus comprising a standard, a truss frame mounted thereon, angled tracks mounted upon said frame, sprocket wheels upon the latter, an endless link chain carrier, lugs projecting from the arms of said links, anti-friction wheels mounted upon said lugs and adapted to travel upon said tracks, shafts journaled in suitable bearings upon the frame, worm wheels fixed to said shafts, a motor and gear connections between the same and said shafts and take-up means for regulating the length of the conveyer chain, as set forth.

5. A loading and unloading apparatus comprising a standard, a truss frame mounted thereon, angled tracks mounted upon said frame, sprocket wheels upon the latter, an endless link chain carrier, lugs projecting from the arms of said links, anti-friction wheels mounted upon said lugs and adapted to travel upon said tracks, shafts journaled in suitable bearings in said frame, worm wheels fixed to said shafts, gear connections between said shafts and sprocket wheels, take-up mechanism for regulating the length of the conveyer chain and means for adjusting said take-up mechanism, as set forth.

6. A loading and unloading apparatus comprising a standard, tracks upon which said standard is adapted to travel, a tilting truss frame mounted upon said standard, means for tilting said frame, a track upon which the standard is mounted, side tracks between which said standard is adapted to be guided, the upper portion of said standard having a lateral projection, wheels carried by said extension and tracks for guiding the latter, as set forth.

7. A loading and unloading apparatus comprising a standard and having a lateral projection at the upper end thereof, a track upon which the standard is mounted, anti-friction wheels mounted upon said projection, a track upon which one of the anti-friction rollers of said extension is adapted to rest and tracks upon either side of the depending portion of said extension and against which wheels carried by said depending portion are adapted to bear, as set forth.

In testimony whereof I hereunto affix my signature in presence of two witnesses.

FRANKLIN B. CLARK.

Witnesses:
 W. A. COLLINS,
 WM. M. JOHNSTON.